(12) United States Patent
Robert et al.

(10) Patent No.: US 6,503,973 B2
(45) Date of Patent: Jan. 7, 2003

(54) VULCANIZABLE RUBBER COMPOSITION USABLE FOR THE MANUFACTURE OF A TIRE, AND A TIRE COMPRISING THIS COMPOSITION

(75) Inventors: Pierre Robert, Perignat-Les-Sarlieve (FR); Jean-Luc Cabioch, Chateaugay (FR); Jean-Michel Favrot, Cournon-D'Auvergne (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 139 days.

(21) Appl. No.: 09/794,667

(22) Filed: Feb. 27, 2001

(65) Prior Publication Data

US 2001/0036991 A1 Nov. 1, 2001

(51) Int. Cl.$^7$ .................................................. C08K 3/34
(52) U.S. Cl. ........................ 524/492; 525/299; 525/300; 525/332.5; 525/332.8; 525/333.1
(58) Field of Search .......................... 524/492; 525/299, 525/300, 332.5, 333.1, 332.8

(56) References Cited

U.S. PATENT DOCUMENTS

| | | | |
|---|---|---|---|
| 3,135,716 A | 6/1964 | Uraneck et al. | 260/45.5 |
| 3,244,664 A | 4/1966 | Zelinski et al. | 260/41.5 |
| 3,842,111 A | 10/1974 | Meyer-Simon et al. | 260/448.2 |
| 3,873,489 A | 3/1975 | Thurn et al. | 260/33.6 AQ |
| 3,978,103 A | 8/1976 | Meyer-Simon et al. | 260/448.8 R |
| 3,997,581 A | 12/1976 | Pletka et al. | 260/448.8 R |
| 4,002,594 A | 1/1977 | Fetterman et al. | 260/42.37 |
| 4,029,720 A | 6/1977 | Seiler et al. | 260/887 |
| 5,066,721 A | 11/1991 | Hamada et al. | 525/102 |
| 5,336,722 A * | 8/1994 | Faul et al. | 525/113 |
| 5,527,170 A | 6/1996 | Graves et al. | 425/52 |
| 5,580,919 A | 12/1996 | Agostini et al. | 524/430 |
| 5,583,245 A | 12/1996 | Parker et al. | 556/427 |
| 5,663,396 A | 9/1997 | Musleve et al. | 556/427 |
| 5,684,171 A | 11/1997 | Wideman et al. | 556/427 |
| 5,684,172 A | 11/1997 | Wideman et al. | 556/427 |
| 5,696,197 A | 12/1997 | Smith et al. | 524/495 |
| 5,703,167 A * | 12/1997 | Ohmae et al. | 525/207 |
| 5,777,013 A | 7/1998 | Gardiner et al. | 524/274 |
| 5,852,099 A | 12/1998 | Vanel | 524/494 |
| 5,900,449 A | 5/1999 | Custodero et al. | 524/430 |
| 6,013,718 A | 1/2000 | Cabioch et al. | 524/506 |
| 6,071,995 A | 6/2000 | Labauze | 524/269 |
| 6,075,092 A * | 6/2000 | Nakamura et al. | 525/122 |
| 6,255,446 B1 * | 7/2001 | Nakamura et al. | 528/393 |

FOREIGN PATENT DOCUMENTS

| | | | |
|---|---|---|---|
| EP | 0501227 | 9/1992 | |
| EP | 0735088 | 10/1996 | |
| EP | 0877047 | 11/1998 | |
| WO | 9637547 | 11/1996 | |
| WO | WO 01/87993 A2 * | 11/2001 | C08F/8/00 |

* cited by examiner

Primary Examiner—Edward J. Cain
Assistant Examiner—Katarzyna Wyrozebski-Lee
(74) Attorney, Agent, or Firm—Baker Botts L.L.P.

(57) ABSTRACT

The present invention relates to a vulcanizable rubber composition which can be used for the manufacture of tires. The invention also provides for a tire, the tread of which comprises such a composition. The rubber composition posses improved hysteresis and physical properties in the vulcanized state, while retaining satisfactory processing properties in the non-vulcanized state. The rubber composition comprises a reinforcing white filler and a diene block copolymer which is intended to interact with the white filler, the block copolymer comprising a diene block polymer having on at least one chain end thereof a polyether block having a molecular weight of between 1000 g/mol and 3000 g/mol, the polyether block corresponding to the formula:

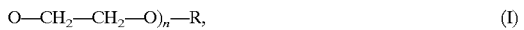

$$O{-}CH_2{-}CH_2{-}O)_n{-}R, \qquad (I)$$

in which n is an integer other than zero and R is a saturated or unsaturated hydrocarbon.

16 Claims, No Drawings

VULCANIZABLE RUBBER COMPOSITION USABLE FOR THE MANUFACTURE OF A TIRE, AND A TIRE COMPRISING THIS COMPOSITION

BACKGROUND OF THE INVENTION

The present invention relates to a vulcanizable rubber composition which can be used for the manufacture of tires. The invention also provides for a tire, the tread of which comprises such a composition. The rubber composition of the invention possesses improved hysteresis and physical properties in the vulcanized state, while retaining satisfactory processing properties in the non-vulcanized state.

Since fuel economics and the need to preserve the environment have become priorities, it has become desirable to produce rubber mixes having good mechanical properties and as low a hysteresis as possible so that they can be processed in the form of rubber compositions usable for the manufacture of various semi-finished products involved in the constitution of tires, such as, for example, underlayers, sidewalls or treads, and in order to obtain tires having reduced rolling resistance.

To achieve such an objective, numerous solutions have been proposed, in particular those that modify the structure of diene polymers and copolymers at the end of polymerization by means of functionalizing, coupling or starring agents. The very great majority of these solutions have concentrated on the use of functionalized polymers which are active with respect to carbon black, with the aim of obtaining a good interaction between the polymer, thus modified, and the carbon black.

By way of illustration, the prior art relating to reinforcing fillers formed of carbon black, includes, for example, U.S. Pat. No. 3,135,716, which describes the reaction of living diene polymers at the end of a chain with a polyfuinctional organic coupling agent in order to obtain polymers having improved properties. Mention may also be made of U.S. Pat. No. 3,244,664, which discloses the use of tetra-alkoxysilanes as coupling or starring agent for diene polymers.

Silica has long been used as a reinforcing filler in vulcanizable rubber compositions, in particular those intended for use in tire treads. However, this use has remained very limited, because of an unsatisfactory level of certain physical properties of such compositions, in particular abrasion resistance.

In order to overcome these drawbacks, the use of functionalized diene polymers instead of the non-functionalized polymers which were used before has been proposed. In particular, polymers functionalized by alkoxysilane derivatives, such as tetra- ethoxysilanes, has been proposed. For example, U.S. Pat. No. 5,066,721 describes a rubber composition comprising a diene polymer functionalized by an alkoxysilane having at least one non-hydrolyzable alkoxyl radical, which makes it possible to eliminate the polymerization solvent by steam stripping.

One disadvantage of these functionalization reactions relates to the coupling reactions which accompany them, which generally makes it necessary to use an excess of alkoxysilane and/or intensive mixing, in order to minimize these coupling reactions.

Another drawback of these reactions involves the later implementation of the steam stripping operation, which is necessary to eliminate the polymerization solvent.

Generally, experience has shown that the functionalized polymers obtained in this fashion undergo changes in macrostructure during the stripping operation, which results in serious degradation of their properties, unless the functionalizing agent is an alkoxysilane belonging to a restricted family, such as that described in U.S. Pat. No. 5,066,721.

Consequently, the use of diene polymers comprising an alkoxysilane function to produce rubber compositions comprising silica as reinforcing filler has not proven satisfactory, despite the improved physical properties of these compositions. This is why further research has been carried out on other functionalization reactions with the view to obtaining such rubber compositions.

For example, French patent specification FR-A-2 740 778 of the assignee of the present inventors discloses the use of diene polymers bearing a silanol function or a polysiloxane block having a silanol end at the chain end. For example, a cyclic polysiloxane functionalizing agent is used, such as hexamethylcyclotrisiloxane. The functionalized polymers obtained can be separated from the reaction medium resulting in their formation by steam extraction of the solvent, without their macrostructure and, consequently, their physical properties changing.

These functionalized polymers are intended to be incorporated in vulcanized compositions comprising silica as the majority reinforcing filler, including fillers comprising a blend of silica and carbon black. It has been possible to establish that these polymers impart rubber properties, in particular hysteresis and reinforcement properties in the vulcanized state, which are improved compared with those of control compositions based on non-functionalized diene polymers. Such compositions are at least analogous to those of compositions based on diene polymers comprising an alkoxysilane function.

However, this improvement of the hysteresis and reinforcement properties in the vulcanized state is accompanied by an increase in the Mooney viscosity of the compositions tested relative to control compositions, i.e., by a reduced ability to be worked in the non-vulcanized state.

SUMMARY OF THE INVENTION

The object of the present invention is to overcome the above-identified limitations of the prior art. The inventors have surprisingly discovered that a rubber composition comprising a reinforcing white filler and at least one diene block copolymer which is intended to interact with said reinforcing white filler, wherein said block copolymer comprises a diene polymer block having on at least one end thereof a polyether block having a molecular weight of between 1000 g/mol and 3000 g/mol, said polyether block corresponding to the following formula:

$$O-(CH_2-CH_2-O)_n-R, \qquad (I)$$

in which n is a natural integer other than zero and R is a saturated or unsaturated hydrocarbon group, results in hysteresis properties at small and large deformations which are comparable to those achieved with the functionalized diene polymers mentioned above. In addition, the rubber composition results in processing properties in the non-vulcanized state which are particularly advantageous, because they are close to those obtained with a composition based on a non-functionalized diene polymer.

This diene block copolymer may be produced in several ways, for example, by sequential polymerization or by a grafting reaction. In latter method, the diene block copolymer is produced by reacting a diene polymer block having a halosilane group at a chain end thereon with a polyether having at least one hydroxyl radical at a chain end thereof.

The grafting reaction is performed either continuously or discontinuously in the presence of a tertiary amine, for example dimethylaminopyridine, in a dispersion or in solution.

The diene polymer block may be statistical, sequential or microsequential and may have any appropriate microstructure, which each is a function of the specific processing conditions, such as the presence or absence of a modifying and/or randomizing agent and the amounts of modifying and/or randomizing agent used.

DETAILED DESCRIPTION OF THE INVENTION

In regard to the present invention, "diene polymer block" comprises any homopolymer obtained by polymerization of a conjugated diene monomer having 4 to 12 carbon atoms, or any copolymer obtained by copolymerization of one or more dienes conjugated together or with one or more vinyl aromatic compounds having 8 to 20 carbon atoms. Such copolymers contain 20% to 99% by weight of diene units, and 1 to 80% by weight of vinyl aromatic units.

Suitable conjugated dienes include 1,3-butadiene, 2-methyl-1,3-butadiene, 2,3-di(C1 to C5 alkyl)-1,3-butadienes, such as 2,3-dimethyl-1,3-butadiene, 2,3-diethyl-1,3-butadiene, 2-methyl-3-ethyl-1,3-butadiene, 2-methyl-3-isopropyl- 1,3 -butadiene, and phenyl-1,3-butadiene, 1,3-pentadiene and 2,4-hexadiene.

Suitable vinyl aromatic compounds include, styrene, ortho-, para- or meta- methylstyrene, the commercial "vinyltoluene" mixture, para-tert.butylstyrene, the methoxystyrenes, vinyl mesitylene, divinyl benzene and vinyl naphthalene.

The diene polymer block preferably comprises the following diene polymers copolymers:

polybutadienes, in particular those having a mass content of 1,2-units from 4% to 80%, polyisoprenes having a content of vinyl units of less than 80%, styrene-butadiene copolymers, in particular, those having a mass content of styrene from 4% to 50%, more particularly from 20% to 40%, and mass contents of 1,2-bonds and trans-1,4 bonds from 4% to 65% and 30% to 80% respectively, butadiene-isoprene copolymers, in particular those having a mass content of isoprene from 5% to 90% and a glass transition temperature (Tg) ranging from −80° C. to −20° C., isoprene-styrene copolymers, in particular those having a mass content of styrene from 5% to 50% and an amount of vinyl units which is less than 90%, butadiene-styrene-isoprene terpolymers, in particular those having a mass content of styrene from 5% to 50%, more particularly from 10% to 40%, a mass content of isoprene from 15% to 60%, more particularly from 20% to 50%, a mass content of butadiene from 5% to 50%, more particularly from 20% to 40%, a mass content of 1,2 units of the butadiene part from 4% to 85%, a mass content of trans-1,4 units of the butadiene part from 6% to 80%, a mass content of 1,2- and 3,4-units of the isoprene part from 5% to 70%, and a mass content of trans-1,4 units of the isoprene part from 10% to 50%.

The diene polymer block can be prepared by reacting a living diene polymer with a dihalodialkylsilane. According to a preferred embodiment of the invention, the diene polymer block is produced in two stages, first by reacting a living diene polymer with a cyclic organosiloxane (as described in patent specification FR-A-2 740 778) to obtain a polymer having a lithium silanolate end followed by reacting this latter polymer with a dialkyldihalosilane. This process for producing the diene polymer block has the advantage of reducing the amount of coupled polymer.

Preferably, the living diene polymer is obtained anionically, by means of a monofunctional or difunctional organometallic initiator, depending on whether it is desired to obtain, for the block copolymer of the invention, a polyether block on only one or both of the chain ends, respectively. This initiator may be an alkyllithium, preferably n-butyllithium, or a lithium amide.

The polyether has at least one hydroxyl group at one of its chain ends and an alkyl or an aryl group at its other chain end, preferably an alkyl group, in order to produce the block copolymer having a polyether block corresponding to formula (I).

A rubber composition according to the invention is obtained by mixing, by means of thermomechanical working, said diene block copolymer with a reinforcing white filler present in a majority portion in the reinforcing filler used and with additives suitable for obtaining a vulcanizable rubber composition.

According to variant embodiments of the composition according to the invention, said diene block copolymer may be used in a blend with one or more other elastomers conventionally used in tires, such as natural rubber or a blend based on natural rubber and a synthetic elastomer, or alternatively another diene elastomer which may be coupled and/or starred, or alternatively another diene elastomer which is possibly coupled and/or starred, or alternatively partially or completely functionalized by a block other than a polyether block of said formula (I).

However, the improvement in the properties of the rubber composition according to the invention are greater, when a lower proportion of such conventional elastomers are used. Advantageously, such conventional elastomers may be present in a quantity of from 1 to 70 parts by weight per 100 parts by weight of the diene block copolymer comprising at least one polyether block according to the invention.

"Reinforcing white filler" is understood herein to mean a "white" filler (i.e. an inorganic filler, particularly a mineral filler), sometimes also called "clear" filler, which is capable, on its own, without any means other than an intermediate coupling system, of reinforcing a rubber composition intended for the manufacture of tires. In other words the reinforcing white filler is capable of replacing a conventional filler of tire-grade carbon black in its reinforcement function.

Preferably, the reinforcing white filler is, in its entirety or at least in a majority portion, silica ($SiO_2$). The silica used may be any reinforcing silica known to those skilled in the art, in particular any precipitated or pyrogenic silica having a BET surface area and a specific CTAB surface area both of which are less than 450 $m^2/g$. The highly dispersible precipitated silicas are preferred.

In the present specification, the BET specific surface area is determined in known manner, in accordance with the method of Brunauer, Emmet and Teller described in "The Journal of the American Chemical Society", vol. 60, page 309, February 1938, and corresponding to Standard AFNOR-NFT-45007 (November 1987); the CTAB specific surface area is the external surface area determined in accordance with the same Standard AFNOR-NFT-45007 of November 1987.

"Highly dispersible silica" is understood to mean any silica having a very substantial ability to disagglomerate and to disperse in an elastomeric matrix, which can be observed in known manner by electron or optical microscopy on thin sections. Non-limiting examples of such preferred highly dispersible silicas include the silica Perkasil KS 430 from Akzo, the silica BV 3380 from Degussa, the silicas Zeosil 1165 MP and 1115 MP from Rhodia, the silica Hi-Sil 2000 from PPG, the silicas Zeopol 8741 or 8745 from Huber, and treated precipitated silicas, such as the aluminium-"doped" silicas described in application EP-A-0 735 088.

The physical state in which the reinforcing white filler is present is immaterial; thus it may be in the form of a powder, microbeads, granules or balls. "Reinforcing white filler" is also understood to mean mixtures of different reinforcing white fillers, in particular, mixtures of highly dispersible silicas such as described above.

According to a preferred example of embodiment of the invention, the reinforcing filler of the rubber composition comprises a majority of reinforcing white filler (i.e., the mass fraction of reinforcing white filler in the entire reinforcing filler of the rubber composition is greater than 50%).

The reinforcing filler also may be a blend (mixture) of fillers, comprising the above-mentioned reinforcing white filler(s) and carbon black in a minority proportion (i.e., in a mass fraction of less than 50% of the total amount of reinforcing filler). Suitable carbon blacks are all the carbon blacks, in particular the blacks of the type HAF, ISAF and SAF, which are conventionally used in tires, and particularly in treads for tires. Non-limiting examples of such blacks, include the blacks N115, N134, N234, N339, N347 and N375.

For example, black/silica blends or blacks partially or integrally covered with silica are suitable to form the reinforcing filler. Also suitable are carbon blacks modified by silica, including, inter alia, the fillers sold by CABOT under the name "CRX 2000", which are described in WO-A-96/37547.

Where the reinforcing filler contains only a reinforcing white filler and carbon black, the mass fraction of the carbon black in said reinforcing filler is preferably selected to be less than or equal to 30% of the amount of reinforcing filler.

However, experience has shown that the aforementioned properties of the composition according to the invention are most greatly improved, the higher the mass fraction of reinforcing white filler that is used in the reinforcing filler in the rubber composition. Said properties are optimum when said rubber composition contains solely a reinforcing white filler, for example silica, as reinforcing filler. The latter, therefore, constitutes a preferred example of a rubber composition according to the invention.

The rubber composition according to the invention furthermore comprises, in conventional manner, a reinforcing white filler /elastomeric matrix bonding agent (also referred to as coupling agent), the function of which is to ensure sufficient chemical and/or physical bonding (or coupling), between the white reinforcing filler and the elastomeric matrix, while facilitating the dispersion of the white filler within said matrix.

Such a bonding agent, which is at least bifunctional, has, for example, the simplified general formula "Y-T-X", in which:

Y represents a functional group ("Y" function) which is capable of bonding physically and/or chemically with the white filler, such a bond being able to be established, for example, between a silicon atom of the coupling agent and the hydroxyl (OH) surface groups of the filler (for example, surface silanols in the case of silica);

X represents a functional group ("X" function) which is capable of bonding physically and/or chemically with the elastomer, for example by means of a sulphur atom; and T represents a hydrocarbon group that links Y and X.

These bonding agents are not to be confused with simple agents for covering the filler in question which, in known manner, may comprise the Y function which is active with respect to the filler but are devoid of the X function which is active with respect to the elastomer.

Such bonding agents, of variable effectiveness, have been described in a large number of documents and are well-known to those skilled in the art. In fact, any known bonding agent may be used to ensure effective bonding between the silica and diene elastomer in diene rubber compositions which can be used for the manufacture of tires. Such bonding agents include organosilanes, in particular polysulphurized alkoxysilane or mercaptosilanes, or polyorganosiloxanes bearing the X and Y functions mentioned above.

In particular, polysulphurized alkoxysilanes are used, such as those described in U.S. Pat. Nos. 3,842,111, 3,873,489, 3,978,103, 3,997,581, 4,002,594, 5,580,919, 5,583,245, 5,663,396, 5,684,171, 5,684,172 and 5,696,197.

Particularly suitable bonding agents for the rubber composition of the invention, without the definition below being limiting, are so-called "symmetrical" polysulphurized allkoxysilanes which satisfy the following general formula (II):

Z—A—S$_n$—A—Z,    (II)

in which:

n is an integer from 2 to 8;

A is a divalent hydrocarbon radical;

Z corresponds to one of the following formulae:

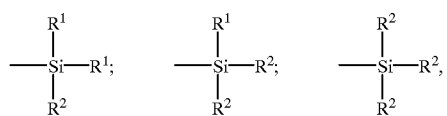

in which:

R$^1$, which may or may not be substituted, and may be identical or different, each represents a C$_1$–C$_{18}$ alkyl group, a C$_5$–C$_{18}$ cycloalkyl group, or a C$_6$–C$_{18}$ aryl group;

R$^2$, which may or may not be substituted, and may be identical or different, each represents a C$_1$–C$_{18}$ alkoxyl group or a C$_5$–C$_{18}$ cycloalkoxyl group.

In formula (II) the number n is preferably an integer from 3 to 5.

In the case of a mixture of polysulphurized alkoxysilanes in accordance with Formula (II) particularly conventional, commercially available, mixes, the average value of "n" is a fractional number, preferably between 3 and 5, more preferably close to 4.

Radical A, whether substituted or not, is preferably a divalent, saturated or non-saturated hydrocarbon radical, comprising 1 to 18 carbon atoms. In particular A comprises a C$_1$–C$_{18}$ alkylene group or C$_6$–C$_{12}$ arylene group, more particularly a C$_1$–C$_{10}$ alkylene, in particular a C$_2$–C$_4$ alkylene, preferably propylene.

The $R^1$ radicals are preferably a $C_1$–$C_6$ alkyl, a cyclohexyl or a phenyl, in particular a $C_1$–$C_4$ alkyl group, more particularly methyl and/or ethyl.

The $R^2$ radicals are preferably a $C_1$–$C_8$ alkoxyl or a $C_5$–$C_8$ cycloalkoxyl, more particularly methoxyl and/or ethoxyl.

Such so-called "symmetrical" polysulphurized alkoxysilanes, and processes for obtaining them are described, for example, in U.S. Pat. Nos. 5,684,171 and 5,684,172, which give a detailed list of these known compounds, for n varying from 2 to 8.

Preferably, the polysulphurized alkoxysilane used in the invention is a polysulphide, in particular a tetrasulphide, of bis(alkoxy($C_1$–$C_4$)silylpropyl), more preferably of bis (trialkoxy($C_1$–$C_4$)silylpropyl), in particular of bis(3-triethoxysilylpropyl) or of bis(3-trimethoxysilylpropyl).

A particularly preferred bonding agent for use in the present invention is bis(triethoxysilylpropyl) tetrasulphide, or TESPT, of the formula $[(C_2H_5O)_3Si(CH_2)_3S_2]_2$, which is sold by Degussa under the name Si69 (or X50S when it is supported to 50% by weight on carbon black), or by Witco under the name Silquest A1289. In both cases, the bonding agent is a commercial mixture of polysulphides having an average value of n which is close to 4.

Those skilled in the art will be able to adjust the content of bonding agent in the compositions of the invention, according to the intended application, the elastomeric matrix used and the quantity of reinforcing white filler used.

In the rubber compositions according to the invention, the content of bonding agent may be within a range from 0.5 to 15% relative to the mass of reinforcing white filler, preferably, within a range from 5 to 10%.

The bonding agent may be grafted beforehand (via the "X" function) onto the diene elastomer of the composition of the invention, the elastomer thus functionalized or "precoupled" thereby comprising the free "Y" function for the reinforcing white filler. It could also be grafted beforehand (via the "Y" function) onto the reinforcing white filler, the thus "precoupled" filler then being able to be bonded to the diene elastomer by means of the free "X" function.

It is preferred, however, for reasons of better processing of the compositions in the non-vulcanized state, to use the bonding agent, either grafted onto the reinforcing white filler, or in the free (i.e. non-grafted) state.

Additional additives which are used in this composition, include plasticizers, pigments, antioxidants, antiozone waxes, a vulcanization system based either on sulphur and/or on peroxide and/or on bismaleimides, vulcanization accelerators, extender oils, one or more agents for covering the silica, such as alkoxysilanes, polyols or amines.

A further subject of the invention is a tread for a tire, which comprises a rubber composition according to the invention. Because of the reduced hysteresis which characterizes the rubber composition according to the invention in the vulcanized state, it will be noted that a tire, the tread of which comprises said composition has an advantageously reduced rolling resistance.

The aforementioned characteristics of the present invention, as well as others, will be better understood on reading the following description of several examples of embodiment of the invention, which are given by way of illustration and not of limitation.

In the examples which follow, the viscosities are inherent viscosities which are measured in toluene, at a concentration of 1 g/l.

EXAMPLE I

Preparation of a Diene Block Copolymer Comprising Two Blocks, a Styrene-butadiene Copolymer and a Polyether Having a Molecular Weight of 2000 g/mol.

231 g of styrene and 410 g of butadiene, together with 2000 ppm of tetrahydrofuran (parts per million of THF) are injected into a 10-liter reactor containing 5.8 liters of toluene. Once the impurities in the solution to be polymerized have been neutralized by the addition of n-BuLi, 0.0032 mol of active n-BuLi is added. The polymerization is carried out at 40° C.

When the conversion rate of the monomers reaches 75% (rate reached at the end of 30 minutes, with an inherent viscosity of the reaction medium which is then equal to 1.40 dl/g), a solution of 10 ml previously deaerated toluene containing 0.012 mol of hexamethylcyclotrisiloxane is injected into the reactor. The solution thus obtained is stirred for 30 minutes at 40° C. 0.030 mol of dichlorodimethylsilane is added, with the resulting polymer solution being stirred for 15 minutes at 40° C.

A solution of 50 ml deaerated toluene containing 90 g of a polyether formed from an anhydrous polyethylene glycol having at one of its chain ends a methyl group and at its other chain end a hydroxyl group and 0.005 mol dimethylaminopyridine are added. This polymer solution is stirred for one hour at 60° C.

The polyether which is sold by FLUKA had been prepared beforehand by anionic polymerization of ethylene oxide and corresponds to the formula (I) where, R is a methyl group.

The polymerization is stopped and the copolymer obtained is treated by means of an antioxidant; 0.2 parts per hundred parts of elastomer (phr) of 2,2'-methylene-bis-(4-methyl-6-tert.butylphenol) and 0.2 phr of N-(1,3-dimethylbutyl)-N'-phenyl-p-phenylene diamine, respectively, are added.

The block copolymer so obtained is recovered by a conventional steam stripping operation for the solvent, and dried on a tool at 100° C. for 10 minutes.

The inherent viscosity of the block copolymer (in toluene) after stripping and drying is 1.50 dl/g and the Mooney viscosity ML (1+4, 100° C.) is 30.

Near infrared analysis of the block copolymer shows that the SBR block contains 26% by weight of styrene. The butadiene fraction for its part contains 41% vinyl units.

Analysis by the technique of size exclusion chromatography (SEC) shows that no free polyether remains.

The number-average molecular weight (Mn) of the block copolymer, determined by osmometry, is 175,000 g/mol.

$^1$H NMR analysis of the block copolymer is carried on a sample which has undergone three series of treatments, each a of coagulation in methanol followed by redissolving in toluene. An apparatus sold under the name "BRUKER AC200" was used for $^1$H NMR analysis.

The number of [—OCH$_2$CH$_2$—] units per 100 styrene-butadiene units, was determined to be equal to 1.2, for a chemical displacement of 3.42 ppm, for this block copolymer. Approximately 75% of the block copolymer is the styrene-butadiene copolymer based on the number-average molecular weight (Mn) and that of the polyether block (2000 g/mol) measured by the SEC technique.

II. Comparative Examples of Rubber Compositions According to the Invention:

In the following examples, the properties of the compositions of the invention are evaluated as follows:

Mooney viscosity ML (1+4) at 100° C.: measured in accordance with ASTM Standard: D-1646, marked "Mooney" in the tables;

moduli of elongation at 300% (ME 300), 100% (ME 100) and at 10% (ME 10): measurements taken in accordance with Standard ISO 37;

hysteresis losses (HL): measured by rebound at 60° C. in %. The deformation for the losses measured is 40%;

SHORE A hardness: measurements made in accordance with Standard DIN 53505; and dynamic shear properties: measurements as a function of the deformation, performed at 10 Hertz with a peak-to-peak deformation from 0.15% to 50%. The non-linearity expressed is the difference in the shear modulus between 0.15% and 50% deformation, in MPa. The hysteresis is expressed by the measurement of tan delta at 7% deformation and at 23° C. in accordance with Standard ASTM D2231-71 (reapproved in 1977).

EXAMPLE II.1

In this example, the contributions of three elastomers designated "SBR A, SBR B, SBR C" respectively within rubber compositions designated A, B and C, having only silica as reinforcing filler, used in forming a tread for a passenger-car tire, were studied. These three elastomers have the following characteristics:

SBR A is a control SBR which was synthesized in accordance with Example I above, with the exception that the polymerization reaction was stopped by addition of methanol, SBR B is an SBR which has a dimethylsilanol function, which is obtained by addition of hexamethylcyclotrisiloxane when the rate of conversion of the monomers reaches 70% (reference may be made to French Patent Specification FR-A-2 740 778 for a description of this functionalization), and SBR C is a functionalized SBR according to the invention, the synthesis of which was described in Example I.

The formulation used for each of these three compositions A, B and C is as follows, in parts by weight per hundred parts of elastomer (phr):

| | |
|---|---|
| Elastomer | 100 phr |
| Silica (1) | 80 phr |
| Aromatic oil (2) | 40 phr |
| Bonding agent (3) | 6.4 phr |
| ZnO | 2.5 phr |
| Stearic acid: | 1.5 phr |
| Antioxidant (4) | 1.9 phr |
| Antiozone wax (5) | 1.5 phr |
| Sulphur | 1.1 phr |
| Sulphenamide (6) | 2 phr |
| Diphenylguanidine | 1.5 phr | where:
(1)=silica ZEOSIL 1165 from Rhône-Poulenc;
(2)=oil sold under the name Enerflex 65,
(3)=bonding agent "Si69 Dégussa",
(4)=N-(1,3-dimethyl butyl)-n-N'-phenyl-p-phenylenediamine
(5)=wax "C32ST"
(6)=N-cyclohexyl-2-benzothiazylsulphenamide Each composition A, B, C is prepared in accordance with the method described in European Patent Specification EP-A-501 227 in which thermomechanical worlking is carried out in two stages which last for 5 minutes and 4 minutes, respectively, at an average blade speed of 45 rpm, until an identical maximum dropping temperature of 160° C. is reached. The stage during which the vulcanizing system is incorporated is carried out on the "homo-finisher" at 30° C. Vulcanization is carried out at 150° C. for 40 minutes.

The results are set forth in Table 1.

TABLE 1

| COMPOSITION | A | B | C |
|---|---|---|---|
| Properties of the SBR elastomer | | | |
| ML (1 + 4) at 100° C. | 30 | 30 | 29 |
| Properties in the non-vulcanized state | | | |
| ML (1 + 4) at 100° C. | 53 | 85 | 74 |
| Properties in the vulcanized state | | | |
| Shore | 65.6 | 58.4 | 59.4 |
| ME 10 | 5.52 | 3.66 | 3.76 |
| ME 100 | 1.74 | 1.62 | 1.87 |
| ME 300 | 1.99 | 2.34 | 2.64 |
| ME 300/ME 100 | 1.14 | 1.44 | 1.41 |
| Losses HL (60° C., def 35%) | 33.0 | 21.3 | 19.2 |
| Dynamic properties as a function of deformation | | | |
| Delta G*23° C. | 4.03 | 1.16 | 1.13 |
| $\tan_{max}$ 23° C. | 0.352 | 0.229 | 0.232 |

It can readily be seen from Table 1 that SBR C according to the invention, together with a silica reinforcing filler, imparts to vulcanized composition C reinforcement properties which are superior to those obtained with the control composition A, comprising SBR A not in accordance with the invention. The same applies to composition B comprising SBR B, a conventional functionalized elastomer, compared to composition A.

Furthermore, the hysteresis properties at low and high deformations of composition C according to the invention are both significantly improved compared to those of the control composition A and, are close to those of composition B.

In the non-vulcanized state, composition C of the invention has a Mooney viscosity which is lower than that of composition B. Consequently, composition C of the invention has a processing ability which is improved compared with that of composition B comprising a conventional functionalized elastomer (SBR B).

From the above results, the incorporation of a block copolymer according to the invention, such as SBR C, prepared according to Example I, in a rubber composition mmakes it possible to obtain rubber properties which are significantly improved relative to those of a composition having a non-functionalized elastomer, such as SBR A, while having an improved processing ability compared to a composition having a conventional functionalized elastomer, such as SBR B.

EXAMPLE II.2

This example provides rubber compositions D and E, each of which comprises a blend of SBR A according to Example II.1 and a polyether, such as that of Example I.

The formulation of compositions D and E, is the same as in Example II.1, with the exception that the 100 phr of SBR A is replaced:

for composition D, by 99 phr of SBR A and 1 phr of polyether, and for composition E, by 95 phr of SBR A and 5 phr of polyether.

For each composition D and E, the method of mixing is as described in Example II.1 except that the polyether is introduced into the internal mixer at the same time as said SBR A. The results obtained for these two compositions D and E are compared with those previously obtained for compositions A, B and C, in Table 2 below.

TABLE 2

| COMPOSITION | A | B | C | D | E |
|---|---|---|---|---|---|
| Properties of the SBR elastomer | | | | | |
| ML (1 + 4) at 100° C. | 30 | 30 | 29 | 30 | 30 |
| Properties in the non-vulcanized state | | | | | |
| ML (1 + 4) at 100° C. | 53 | 85 | 74 | 53 | 43 |
| Properties in the vulcanized state | | | | | |
| Shore | 65.6 | 58.4 | 59.4 | 62.0 | 66.8 |
| ME 10 | 5.52 | 3.66 | 3.76 | 4.47 | 5.70 |
| ME 100 | 1.74 | 1.62 | 1.87 | 1.86 | 2.15 |
| ME 300 | 1.99 | 2.34 | 2.64 | 2.43 | 2.57 |
| ME 300/ME 100 | 1.14 | 1.44 | 1.41 | 1.31 | 1.20 |
| Losses HL (60° C., def 35%) | 33.0 | 21.3 | 19.2 | 26.9 | 27.9 |
| Dynamic properties as a function of deformation | | | | | |
| Delta G*23° C. | 4.03 | 1.16 | 1.13 | 2.41 | 4.40 |
| $\tan_{max}$ 23° C. | 0.352 | 0.229 | 0.232 | 0.294 | 0.340 |

Table 2 shows that SBR C according to the invention, together with a silica reinforcing filler, imparts to composition C reinforcement properties which are superior to those imparted by control SBR A to compositions A, D and E. Likewise, SBR B imparts superior reinforcement properties to composition B compared to compositions A, D and E.

Furthermore, the hysteresis properties at low and high deformations of composition C according to the invention are improved compared with those of the control composition A, as well as compositions D and E. The same applies to composition B compared to compositions A, D and E.

In particular, composition C according to the invention and composition B each have a hysteresis at low deformation which is significantly lower than that of compositions D and E.

Moreover, a block copolymer according to the invention, such as SBR C, prepared as in Example I, imparts to composition C rubber properties which are close to those of composition B, which comprises elastomer SBR B having a dimethylsilanol function, but improved processing ability compared to composition B.

As shown by the results seen with compositions D and E, a blend of a polyether and a non-functionalized SBR, such as SBR A, does not provide the same improved results, regardless of the amount of polyether added to the blend.

Moreover, while composition D has rubber properties and processing ability similar to that of control composition A, composition D differs from composition A
- by hysteresis losses which are lower than those of composition A, and
- by a ratio ME 300/ME 100 greater than that of this composition A.

We claim:

1. A vulcanizable rubber composition comprising a reinforcing white filler, which can be used for the manufacture of a tire, wherein the rubber composition comprises a diene block copolymer which is intended to interact with said reinforcing white filler, said diene block copolymer comprising a diene polymer block having on at least one chain end thereof a polyether block, the molecular weight of which is between 1000 g/mol and 3000 g/mol, said polyether block corresponding to the formula:

  (I)

in which n is a natural integer other than zero and R is a saturated or unsaturated hydrocarbon group.

2. The rubber composition according to claim 1 in which R is an alkyl group.

3. The rubber composition according to claim 1, wherein the reinforcing white filler as reinforcing filler comprises greater than 50% of the mass fraction of reinforcing filler in the rubber composition.

4. The rubber composition according to claim 1, wherein the reinforcing white filler is silica.

5. The rubber composition according to claim 1, wherein the reinforcing white filler further comprises carbon black in an amount of less than or equal to 30% of the mass fraction of reinforcing filler.

6. The rubber composition according to claim 1, wherein the diene polymer block is a styrene-butadiene copolymer.

7. The rubber composition according to claim 1, wherein the composition comprises a blend of natural rubber and said block copolymer, wherein the natural rubber comprises from 1 to 70 parts by weight per 100 parts by weight of said block copolymer.

8. The rubber composition according to claim 1, wherein the composition comprises a blend of a synthetic and/or starred diene elastomer and said block copolymer, wherein said synthetic and/or starred diene elastomer comprises from 1 to 70 parts by weight per 100 parts by weight of said block copolymer.

9. A vulcanizable rubber composition comprising a silica reinforcing filler, which can be used for the manufacture of a tire, wherein the rubber composition comprises a diene block copolymer intended to interact with the silica, the block copolymer comprising a styrene-butadiene copolymer having on at least one chain end thereof a polyether block having a molecular weight of about 2000 g/mol, said polyether block having the formula

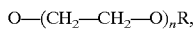

in which n is a natural integer other than zero and R is an alkyl group.

10. A process for the preparation of a vulcanizable rubber composition comprising a reinforcing white filler, wherein the rubber composition comprises a diene block copolymer which is intended to interact with said reinforcing white filler, said diene block copolymer comprising a diene polymer block having on at least one chain end thereof a polyether block, the molecular weight of which is between 1000 g/mol and 3000 g/mol, said polyether block corresponding to the formula

  (I)

wherein the process comprises
- (a) reacting a diene polymer block comprising a halosilane group at a chain end thereof with a polyether having at least one hydroxyl radical at a chain end thereof to produce said diene block copolymer, and
- (b) mixing, by thermomechanical working, said block copolymer with a reinforcing white filler, and with conventional additives for obtaining a vulcanizable rubber composition.

11. The process according to claim 10, wherein the diene polymer and polyether are reacted in the presence of a tertiary amine.

12. The process according to claim 11, wherein the tertiary amine is dimethylaminopyridine.

13. The process according to claim 11 further comprising preparing the diene polymer block comprising a halosilane group by reacting a living diene polymer with a dihalodialkylsilane.

14. The process according to claim 13 further comprising reacting the living diene polymer with a cyclic organosiloxane to obtain a polymer having a lithium silanolate end, then, reacting the diene polymer having a lithium silanolate end with a dialkyldihalosilane.

15. The process according to claims 14, wherein the living diene polymer and cyclic organosilane are reacted in the presence of an alkyllithium or a lithium amide initiator.

16. A tire which comprises a tread, said tread containing a rubber composition according to one of claims 1 to 9.

* * * * *

UNITED STATES PATENT AND TRADEMARK OFFICE
CERTIFICATE OF CORRECTION

PATENT NO. : 6,503,973 B2
DATED : January 7, 2003
INVENTOR(S) : Robert et al.

It is certified that error appears in the above-identified patent and that said Letters Patent is hereby corrected as shown below:

<u>Title page,</u>
Item [57], ABSTRACT,
Line 4, "posses" should read -- possesses --

<u>Column 1,</u>
Line 37, "polyfuinctional" should read -- polyfunctional --

<u>Column 3,</u>
Line 37, "polymers copolymers" should read -- polymers and copolymers --

<u>Column 9,</u>
Line 61, "worlking" should read -- working --

<u>Column 10,</u>
Line 43, "mmakes" should read -- makes --

<u>Column 12,</u>
Line 52, "O—(CH$_2$—CH$_2$—O)$_n$R," should read -- O—(CH$_2$—CH$_2$—O)—R, --
Line 52, after the formula insert -- (I) --

<u>Column 14,</u>
Line 8, "claims" should read -- claim --

Signed and Sealed this

Twenty-sixth Day of August, 2003

JAMES E. ROGAN
*Director of the United States Patent and Trademark Office*